US009147127B2

(12) United States Patent
Shu (10) Patent No.: US 9,147,127 B2
(45) Date of Patent: Sep. 29, 2015

(54) VERIFICATION OF USER PHOTO IDS (71) Applicant: FACEBOOK, INC., Menlo Park, CA (US)

(72) Inventor: Henry Shu, Walnut, CA (US)

(73) Assignee: FACEBOOK, INC., Menlo Park, CA (US)

( * ) Notice: Subject to any disclaimer, the term of this patent is extended or adjusted under 35 U.S.C. 154(b) by 18 days.

(21) Appl. No.: 13/838,825

(22) Filed: Mar. 15, 2013

(65) Prior Publication Data
US 2014/0270411 A1 Sep. 18, 2014

(51) Int. Cl.
*G06K 9/62* (2006.01)

(52) U.S. Cl.
CPC ................... *G06K 9/6211* (2013.01)

(58) Field of Classification Search
None
See application file for complete search history.

(56) References Cited

U.S. PATENT DOCUMENTS

| 5,982,912 | A | * | 11/1999 | Fukui et al. | 382/118 |
| 8,538,065 | B2 | * | 9/2013 | Bladel et al. | 382/100 |
| 2009/0141947 | A1 | * | 6/2009 | Kyyko et al. | 382/118 |
| 2013/0266181 | A1 | * | 10/2013 | Brewer et al. | 382/103 |

OTHER PUBLICATIONS

Grauman, Kristen and Darrell, Trevor, Pyramid Match Kernals: Discriminative Classification with Sets of Image Features, Mar. 18, 2006, Computer Science and Artificial Intelligence Laboratory Technical Report.*

* cited by examiner

*Primary Examiner* — Samir Ahmed
*Assistant Examiner* — Menatoallah Youssef
(74) *Attorney, Agent, or Firm* — Nicholson De Vos Webster & Elliott LLP (57) ABSTRACT

The presence of a target object within a query image may be identified based on the spatial consistency of feature points matched between the query image and a template image describing the target object. A query image and a template image describing a target object to be sought in a query image are received. Feature points are extracted from the query image and the template image using a SIFT method. Query feature points are each matched to the nearest neighbor template feature point. A matched pair of query points is assigned a confidence indicator based on the distance between each parameter of the query feature point and template feature point. The confidence indicators are mapped within a binned four-dimensional space. If the number of confidence indicators mapped to any bin is greater than a threshold value, then the target object has been detected within the query image.

16 Claims, 5 Drawing Sheets

VERIFICATION OF USER PHOTO IDS

FIELD OF INVENTION

The present invention generally relates to image processing, and more particularly, to a method and system for identifying, within a query image, at least one target object matching a template image.

BACKGROUND

Many networks (such as a social network) enable a user to have a presence within the network. A user may maintain a certain level of privacy and security regarding personal details associated with his/her account. When a breach of account privacy or security is suspected, a user may be required by the network to authenticate his/her identity by submitting an image of a government issued identification (GIID) in order to regain access to her account. Large volumes of images may be submitted, and manual review to confirm that each contains a GIID is tedious and time consuming.

DETAILED DESCRIPTION

A system, method, and apparatus for identifying within a query image the presence of a target object matching a template image is described. Many networks include security measures that lock a user account in response to suspicious activity, such as repeated failed login attempts, bot or spam-like behavior, or violations of terms of service. For example, when a user has repeatedly typed in the wrong password for an account (for a bank account, social network account, email account, etc.) in order to regain access, the user may be required to submit a verifiable image (such as the user's government issued identification (GIID)) in order to verify his or her identity. As networks continue to grow, lockout occasions and corresponding access requests grow as well. Manually reviewing each submitted image is labor and time intensive. A method for screening images to reduce the number of images reviewed for verification and authentication of the user identity by reducing the number of images forwarded for verification that do not contain a verifiable image would simply this process.

As will be detailed below, embodiments of the invention describe attempting to detect the presence of a target object within a query image (such as a user submitted image) based on the spatial consistency of feature points matched between the query image and a template (reference) image describing the target object. For example, the presence, or lack thereof, of a target object within a submitted image (such as a purported GIID such as a passport image, driver's license, state or national ID card, etc.) is detected based on the spatial consistency of feature points of that submitted image and a template image.

In these embodiments, query feature points are extracted from the query image and matched to a template's feature points extracted from a template image. Each feature point is represented by an appearance-based descriptor and four parameters: two position coordinates, a scale factor, and an orientation factor. Once these query feature points have been extracted, each query feature point is matched to a template feature point based on the closeness of the feature points' respective appearance-based descriptors. A matched pair of feature points is assigned a confidence indicator based on the distance between the descriptor of the query feature point and the descriptor of the matched template feature point.

The confidence indicators are then mapped within a four-dimensional space divided into a number of configurable sized buckets called bins. Each dimension corresponds to one of the four parameters including the two position coordinates, the scale factor, and orientation factor. Each 4D bin represents a particular quadruple neighborhood defined by:

$$[x_{template}-x_{query}, y_{template}-y_{query}, scale_{template}-scale_{query}, orientation_{template}-orientation_{query}]. \quad (1)$$

If the number of confidence indicators mapped to any bin is greater than a threshold confidence value, then the target object has been detected within the query image. For example, if a bin in the 4D space has 23 confidence indicators in it and the threshold is 22, then the target object has likely been detected. Having a threshold number of confidence indicators fall within a single bin identifies matched feature points that have the same relative position in each of the query image and the template image. The use of the 4D space and confidence indicator binning is more efficient in terms of processing power and time necessary to perform a match. A query image having a large number of feature points that are spatially consistent with feature points in the template image is more likely to contain an object matching the object described by the template image.

As detailed above, the submitted images are compared to template images. In embodiments detailed below, an image processing system identifies objects (groups of feature points) contained within a submitted image. For example, in order to verify the identity of a user of a network, the user may be asked to submit an image of her GIID and an image processing system will determine if the GIID is real or fake. A GIID is used throughout this description as an example of the types of images that may be used for verification, however, the discussion below does not need to be limited in such a manner. For example, corporate identification cards may be used.

Figure 1:
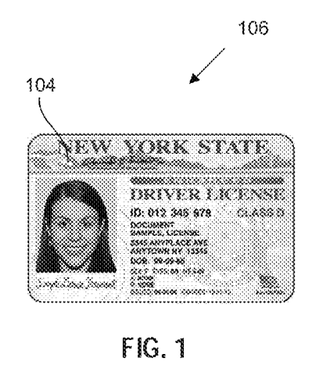
FIG. 1 illustrates a query image containing a target object, according to an embodiment of the invention.
Figure 2:
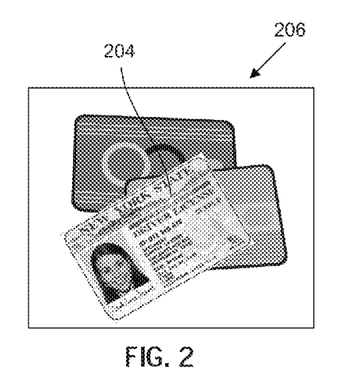
FIG. 2 illustrates a query image containing a number of objects, including a target object, according to an embodiment of the invention.
Figure 3:
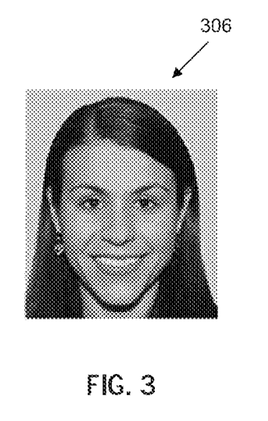
FIG. 3 illustrates a query image that does not contain a target object, according to an embodiment of the invention.

Examples of query images received by an image processing system are shown in FIGS. 1-3. As shown in FIG. 1, a query image 106 (a state driver's license) contains only user GIID 104. For example, a user may have scanned in her GIID 104 so that the image processing system has a relatively clean image to work with. Unfortunately, many users will not take the time to create a single image to view. As shown in FIG. 2, a user GIID 204 may be one of multiple objects within query image 206. For example, the GIID 204 may be on top of a pile of other objects within the submitted image, such as what would happen if a user took a picture of their driver's license on top of a stack of other items.

FIG. 3 illustrates an example where query image 306 does not contain a GIID. In this example, the user has merely submitted a picture of herself. In systems that do not utilize a GIID for user verification, but rather compare known images (such as a verified picture) to submitted images, this would be acceptable. However, when a GIID is required, this would not be sufficient as this image lacks many features found in GIID's such as watermarks, etc.

Figure 4:
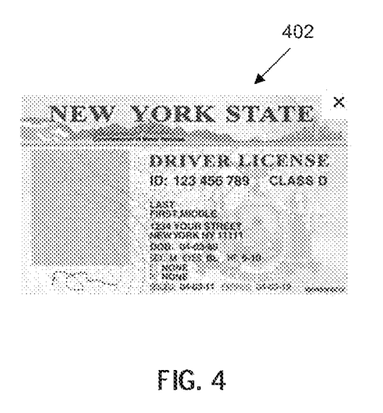
FIG. 4 illustrates a template image, according to an embodiment of the invention.

A query image received by the image processing system is compared to a number of templates of various known images called template or reference images in order to determine if the query image contains a matching object. FIG. 4 illustrates an example GIID template image 402. It is to be understood that a target object, such as a GIID, that matches a template image will share features with the template, but may not be an exact image match. This occurs for a variety of reasons such as the picture in a template GIID should rarely match the picture in the user submitted image. Additionally, the method provided herein allows for scale-invariant changes to a target object within a query image, for example, the submitted image may be larger, smaller, or rotated relative to the template image, such as object 204 in FIG. 2.

In some embodiments, query images that are found by the image processing system to include whatever is to be found (such as a GIID), with a certain level of confidence, may be forwarded on for confirmation of identity, while query images found by the image processing system to not contain a GIID will not be forwarded for confirmation. As such, the number of images requiring detailed review is reduced.

Figure 5:
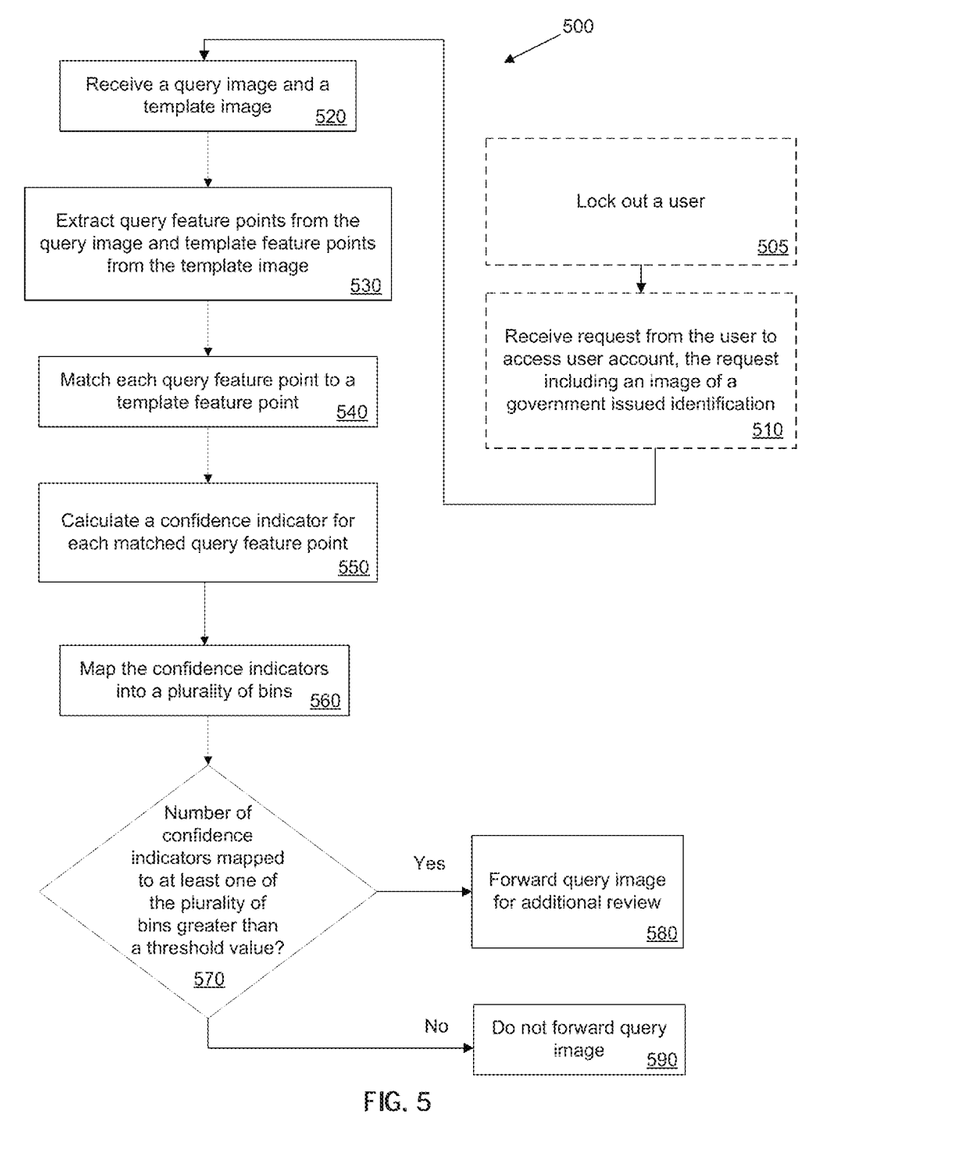
FIG. 5 is a flowchart of a method for determining whether a query image contains an object matching a template image, according to an embodiment of the invention.

FIG. 5 is a flow chart illustrating a method 500 for detecting, within a query image, a target object that matches a template image, with a degree of confidence, according to an embodiment of the invention. At block 505, a user is locked out of his or her account by a network. Events causing a lockout may include improper login attempts, detection of bots, violation of terms of service, or other suspicious behavior. At block 510, a request is received from a user to access the locked user account. In an embodiment, the request includes an image of a GIID belonging to the user. The submitted image becomes the query image for detecting a target object matching a template image of a GIID.

Figure 6:
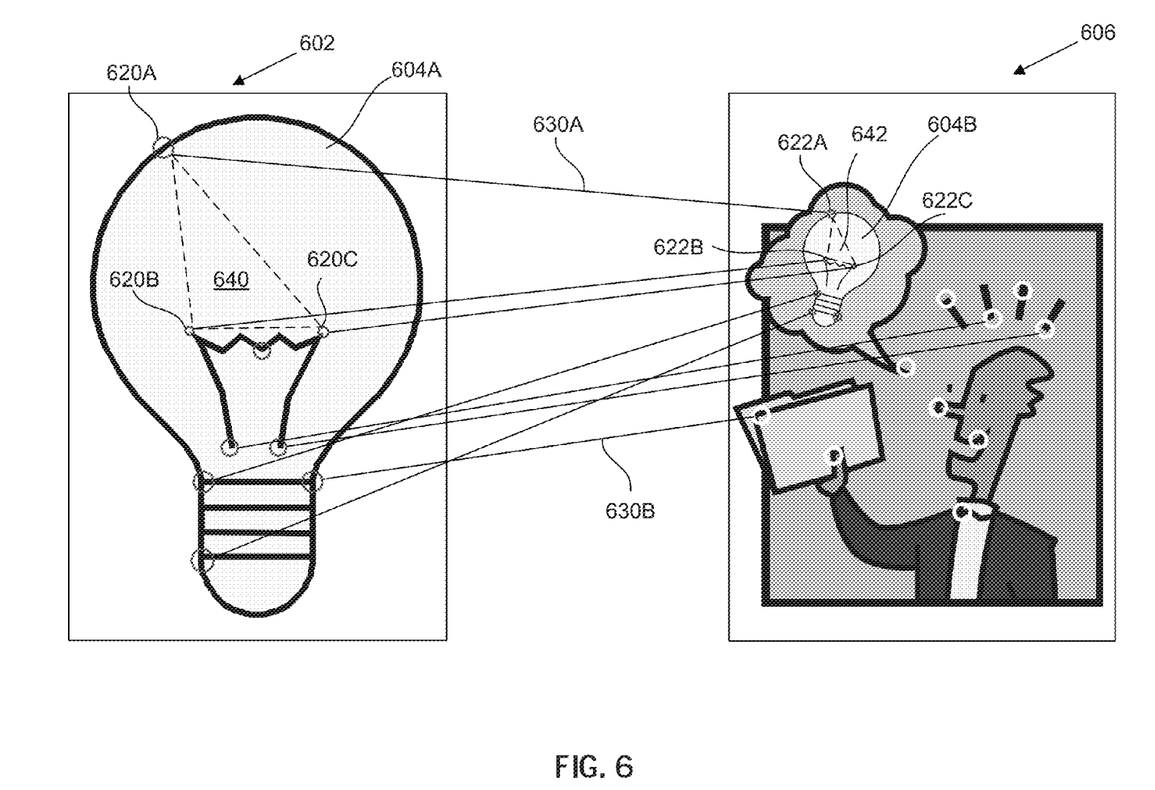
FIG. 6 illustrates query feature points in a query image matched to template feature points in a template image, according to an embodiment of the invention.

At block 520, a query image is received. In an embodiment, the query image is received from a remote user over a network, such as the Internet. In another embodiment, the query image is received from a peripheral device. The peripheral device may be a camera connected to the image processor. In an embodiment, the query image is received from a storage device. The storage device may contain a plurality of query images. An exemplary query image 606 is illustrated in FIG. 6. In the illustration, the query image 606 includes a target object 604B to be matched against a template image. Of course, the query image 606 may not include the target object, in which case a match should not be generated. The query image may also be accompanied by metadata to help identify the template image that should be compared. For example, the user may tell the receiving system that the query image represents a GIID from the state of California. This may help reduce the amount of comparisons that need to be done. In some embodiments, textual recognition is performed on the query image to determine which template image should be used.

In some embodiments, at this stage a template image is retrieved by the system for comparison. These image may be stored locally (such as on a local database) or retrieved from another source (a government website, remote database, etc.). The template image may be retrieved from a storage device. In an embodiment, the template image is one of a plurality of template images with which the query image will be compared. An example template image 602 is illustrated in FIG. 6. The template image 602 includes target object 604A.

At block 530, query feature points are extracted from the query image and template feature points are extracted from the template image. Feature points are distinctive points within an image. For example, a feature point may be a point having a high contrast pixel intensity gradient. Referring to FIG. 6, template image 602 has template feature points 620A/620B/620C and the query image 606 has query feature points 622A/622B/622C.

In an embodiment, feature points are extracted using a scale-invariant feature transform (SIFT) method. In an embodiment, feature points extracted using a SIFT-based method each have an appearance-based descriptor $\{d\}$, two spatial coordinates $\{x, y\}$ locating the feature within the image, a scale factor $\{s\}$ describing the size of the feature, and an orientation factor $\{o\}$ describing the orientation of the feature. Feature points may include additional parameters, for example, illumination.

In an embodiment, a query image or template image may be modified prior to feature point detection. For example, filters may be applied to reduce noise in the image. In addition, thresholds may be set to determine the number of feature points generated. For example, a minimum peak threshold will eliminate feature detection for image points having a peak intensity (e.g., a Gaussian peak) below a threshold value. In another embodiment, an edge threshold may be adjusted to eliminate points having an insufficiently steep contrast gradient.

In an embodiment, feature points are extracted from each of the query image and the template image. In another embodiment, template feature points corresponding to a template image are received, so that feature point detection is not required for the template image. In another embodiment, a database of template feature points corresponding to template images is maintained, so that feature point detection is not required for the template image.

At block 540, each query feature point is matched to a template feature point. In an embodiment, matching occurs by identifying the template feature point closest to each query feature point, based on the distance between the descriptor of the query feature point and the descriptor of the template feature point. In an embodiment, the Euclidian distance between each query feature point descriptor and each template feature point descriptor is calculated. Each query feature point is matched to the template feature point with the descriptor having the shortest Euclidian distance from the descriptor of that query feature point, according to an embodiment. In another embodiment, approximation methods are used to identify the template feature point having the closest descriptor to each query feature point without calculating the distance between every query feature point descriptor and every template feature point descriptor.

Additional limitations may be used to reduce false matching. For example, the ratio of the distance between the first nearest template feature point and second nearest template feature point may be required to exceed a threshold value in order for a match to be found. FIG. 6 illustrates matched pairs of feature points between template image 602 and query image 606 as connected by lines 630A/630B. A matched pair may identify feature points corresponding to shared objects, as shown by the match designated by line 630A, or a matched pair may identify feature points corresponding to distinct objects, as shown by the match designated by line 630B.

At block 550, a confidence indicator is calculated for each matched query feature point. In an embodiment, the confidence indicator is a four-dimensional vector having parameters corresponding to the difference between the position coordinate, scale factor, and orientation factor corresponding to each of the matched query feature point and matched template feature point. For example, a confidence indicator for a pair of matched feature points where the query feature point has the parameters $\{d_q, x_q, y_q, s_q, o_q\}$ and the template feature point has the parameters $\{d_t, x_t, y_t, s_t, o_t\}$ may be calculated by Equation 2:

$$\{x_t-x_q, y_t-y_q, s_t/s_q, o_t-o_q\}. \qquad (2)$$

A target object in a query image may be different in position, scale or orientation from the template image, but each query feature point associated with the target object will have similar translational, scale, and orientation changes. In other words, the query feature points will be spatially consistent with the template feature points where a match exists. As such, spatially consistent feature points, such as those associated with a target object, will have similar confidence indicator values.

For example, template feature points 620A, 620B, and 620C are positioned in a triangle 640, relative to one another. Query feature points 622A, 622B, and 622C are positioned in a triangle 642, relative to one another. Triangle 642 is translated, scaled-down, and rotated relative to triangle 640. However, translation, scale change, and orientation changes between matched feature points 620A and 622A, 620B and 622B, and 620C and 622C are similar. As such, the confidence indicators calculated for each of the matched pairs 622A, 620B and 622B, and 620C and 622C are also similar.

At block 560, the confidence indicators are mapped into a plurality of bins. As detailed above, in an embodiment, a four dimensional space, having one dimension corresponding to each parameter of a four-dimensional confidence indicator, is divided into a plurality of bins. Confidence indicators are plotted within the four dimensional binned space, according to an embodiment. Confidence indicators falling within a single bin are spatially consistent. In an embodiment, each bin has identical dimensions. Bin dimensions may be adjusted for greater or lesser spatial consistency between confidence indicators. Bins may enable identification of a matched object despite some degree of variance between the confidence indicators corresponding to the shared object's matched feature points.

Figure 7:
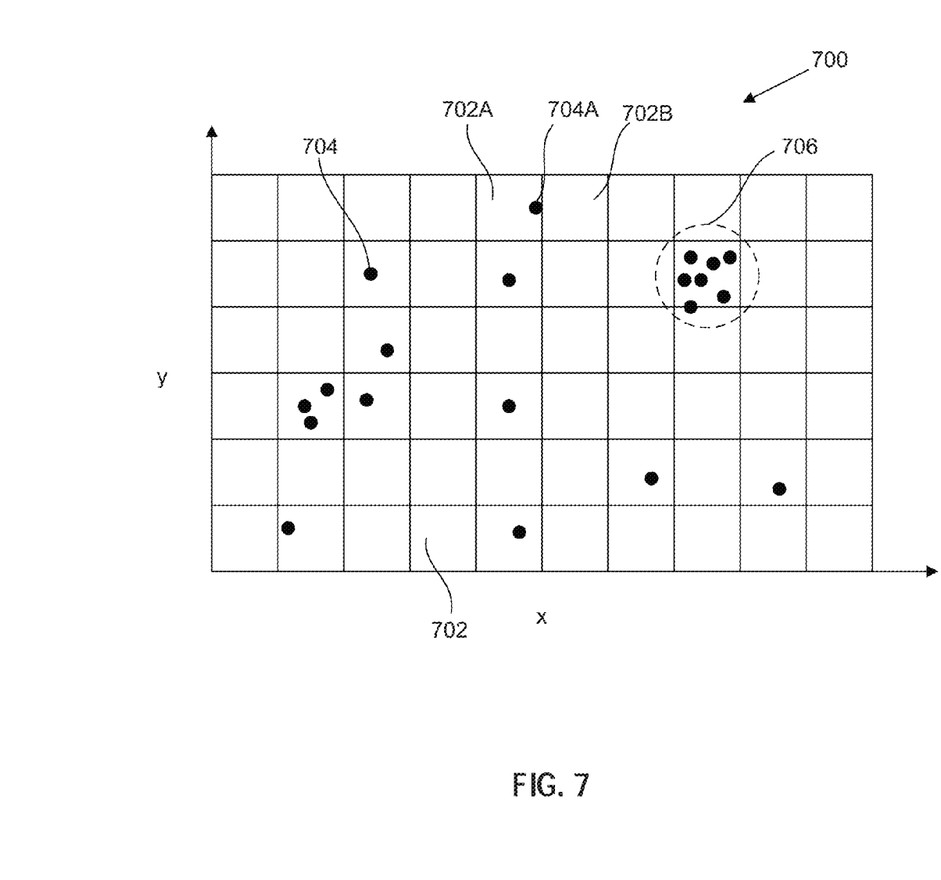
FIG. 7 illustrates confidence indicators mapped within a two-dimensional binned space, according to an embodiment of the invention.

An example embodiment of a binned space 700 showing two dimensions is illustrated in FIG. 7. Binned space 700 comprises a plurality of bins 702/702A/702B, each having identical dimensions. Bins 702 are shown as having equal dimensions in the x and y directions. Confidence indicators 704 are plotted within binned space 700. In an embodiment, a confidence indicator 704 within a bin 702 adds to the total confidence indicator count for that bin. In an embodiment, a confidence indicator 704A that is located near or on the border of a bin 702A adds to the total confidence indicator count of both bin 702A and bin 702B, in order to minimize edge effects.

At block 570, a match between the query image and the template image is detected when the number of confidence indicators mapped to at least one bin is greater than a threshold value. Bins containing more than a threshold value of confidence indicators indicate a critical mass of query feature points having a high degree of spatial consistency. A number of spatially consistent matched feature points indicate a high likelihood of a matching object. The threshold value may be adjusted to achieve the desired matching precision. For example, a larger threshold value requires that a query image have more feature points having a common relative position with template feature points. More shared feature points will indicate a greater likelihood of a match.

At block 580, when a match is detected, the query image may be forwarded on for additional review. For example, if a GIID is detected within a query image, the query image may be forwarded to a processor or person that determines whether the identity displayed by the GIID matches that of the user. At block 590, when a match is not detected, the query image may not be forwarded for further review. For example, when a GIID is not detected in a query image, the image processor may return a result causing the social network to request an alternate image of a GIID from the user.

Figure 8:
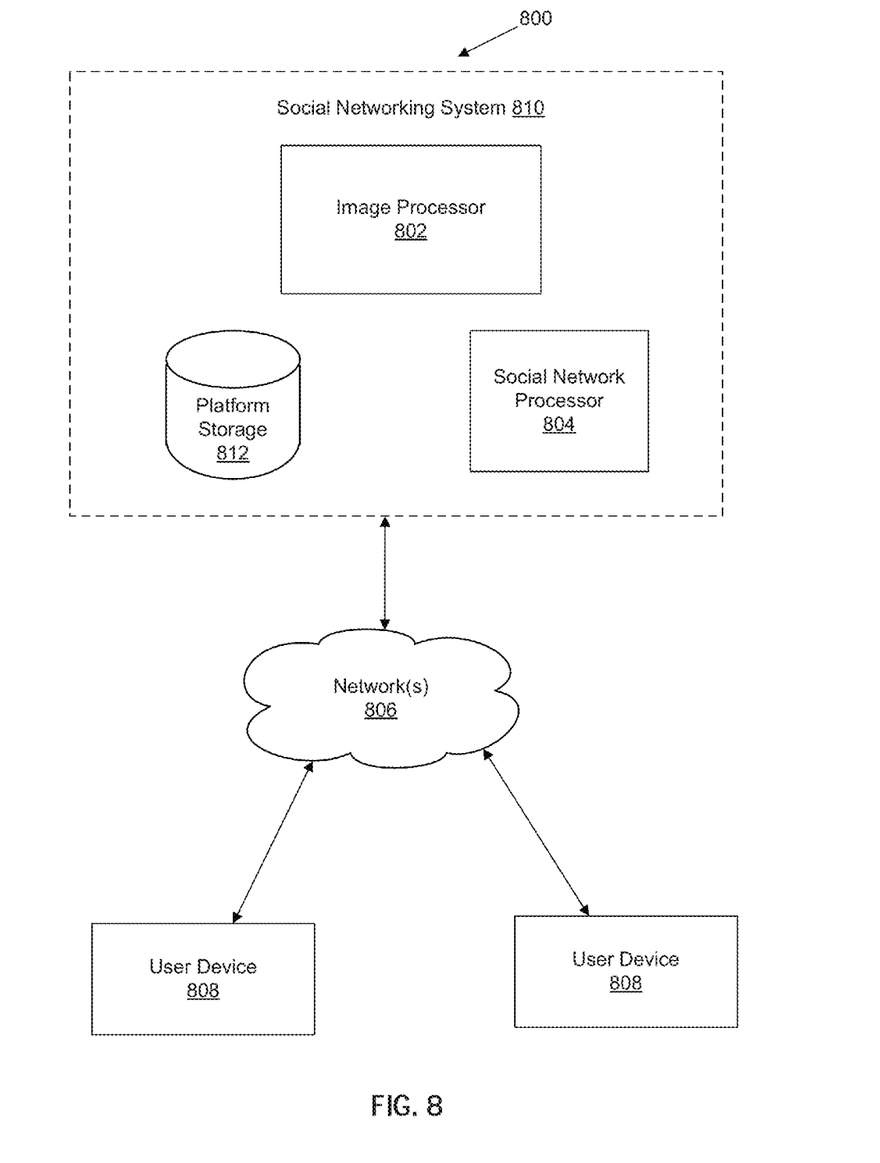
FIG. 8 illustrates, in block diagram form, a social network, according to an embodiment of the invention.

FIG. 8 illustrates, in block diagram form, an exemplary network 800 that utilizes the above described method. In this example, the network 800 is a social network, however, other networks may utilize this approach such as financial networks (banking, etc.), corporate, educational, recreational (such as online video, audio, or video game services), online shopping websites, etc. The exemplary social network 800 includes user devices 808 and a social networking system 810. A user interacts with the social networking system 810 using a user device 808, such as a personal computer or a mobile phone. For example, the user device 808 communicates with the social networking system 810 via an application such as a web browser or native application. A user may use a user device 808 to submit a query image, such as an image of a GIID, to the social networking system 810 via network 806. In an embodiment, a query image may be received by the image processor from a peripheral device (not shown), such as a camera.

The social networking system 810 is illustrated to include a image comparison module 802, platform storage 812, and processor(s) 804. Platform storage 812 stores template images and template feature points. This storage 812 may be one or more databases or may be temporary storage such as RAM. Query images and query feature points may also be stored in platform storage 812 for review. Platform storage 812 may also contain user account data, which may be used to authenticate a known GIID in order to grant access to a locked user account. Platform storage 812 may also be external to the system.

The image processing method 500 described above is performed by the processor(s) 804 utilizing image comparison module 802 and corresponding data, such as template images and template feature points, this is stored in platform storage 812.

It will be apparent from this description that aspects of the inventions may be embodied, at least in part, in software. That is, the computer-implemented method 500 may be carried out in a computer system or other data processing system 800 in response to its processor or processing system 802/804 executing sequences of instructions contained in a memory, such as memory 812 or other non-transitory machine-readable storage medium. The software may further be transmitted or received over a network. In various embodiments, hardwired circuitry may be used in combination with the software instructions to implement the present embodiments. Thus, the techniques are not limited to any specific combination of hardware circuitry and software, or to any particular source for the instructions executed by the data processing system 800.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the present invention. Reference throughout this specification to "one embodiment," "an embodiment" or the like means that a particular feature, implementation, configuration, or characteristic described in connection with the embodiment is included in at least one embodiment of the invention. Thus, the appearances of the phrase "in one embodiment," "an embodiment" or the like in various places throughout this specification are not necessarily referring to the same embodiment of the invention. Furthermore, the particular features, implementations, configurations, or characteristics may be combined in any suitable manner in one or more embodiment.

What is claimed is:

1. A computer-implemented method, comprising:
   receiving, by a processor, a query image;
   extracting, by a processor, a plurality of query feature points from the query image, wherein each query feature point is a vector comprising an appearance-based descriptor, two spatial coordinates, a scale factor, and an orientation factor;
   matching, by a processor, the query feature points to one of a plurality of template feature points in a template image;
   calculating, by a processor, a confidence indicator for each query feature point match;
   mapping, by a processor, the confidence indicators within a four dimensional space divided into a plurality of bins, a first dimension of the four dimensional space corresponding to a first of the two spatial coordinates, a second dimension of the four dimensional space corresponding to a second of the two spatial coordinates, a third dimension of the four dimensional space corresponding to the scale factor, and a fourth dimension of the four dimensional space corresponding to the orientation factor; and
   determining, by a processor, that the query image contains a match to the template image when a number of confidence indicators in at least one of the plurality of bins is greater than a threshold value.

2. The computer-implemented method of claim 1, further comprising:
   receiving, by a processor, a template image; and
   extracting, by a processor, a plurality of template feature points from a template image.

3. The computer-implemented method of claim 1, wherein matching the query feature points to the template feature points comprises, for each query feature point:
   calculating, by a processor, a distance from a query feature point descriptor to each descriptor corresponding to the template feature points; and
   identifying, by a processor, the template feature point having the closest descriptor as the matching template feature point.

4. The computer-implemented method of claim 1, wherein calculating the confidence indicator comprises calculating a difference between each respective coordinate of a matched query feature point and template feature point.

5. The computer-implemented method of claim 1, wherein the template image is an image of a government issued identification.

6. The computer-implemented method of claim 1, wherein the query image contains an image of a government issued identification.

7. The computer-implemented method of claim 1, further comprising:
   locking, by a processor, out a user from a user account; and
   receiving, by a processor, a request from the user to access the user account.

8. A non-transitory computer-readable medium storing instructions, which when executed by a processing device, cause the processing device to perform method comprising:
   receiving a query image;
   extracting a plurality of query feature points from the query image wherein each query feature point is a vector comprising an appearance-based descriptor, two spatial coordinates, a scaling factor, and an orientation factor;
   matching the query feature points to one of a plurality of template feature points in a template image;
   calculating a confidence indicator for each query feature point match;
   mapping the confidence indicators within a four dimensional space divided into a plurality of bins, a first dimension of the four dimensional space corresponding to a first of the two spatial coordinates, a second dimension of the four dimensional space corresponding to a second of the two spatial coordinates, a third dimension of the four dimensional space corresponding to the scale factor, and a fourth dimension of the four dimensional space corresponding to the orientation factor; and
   determining that the query image contains a match to the template image when a number of confidence indicators in at least one of the plurality of bins is greater than a threshold value.

9. The non-transitory computer-readable medium of claim 8, the method further comprising:
   receiving a template image; and
   extracting a plurality of template feature points from a template image.

10. The non-transitory computer-readable medium of claim 8, wherein matching the query feature points to the template feature points comprises, for each query feature point:
    calculating the distance from a query feature point descriptor to each descriptor corresponding to the template feature points; and
    identifying the template feature point having the closest descriptor as the matching template feature point.

11. The non-transitory computer-readable medium of claim 8, wherein calculating the confidence indicator comprises calculating a difference between each respective coordinate of a matched query feature point and template feature point.

12. The non-transitory computer-readable medium of claim 8, wherein the template image is an image of a government issued identification.

13. The non-transitory computer-readable medium of claim 8, wherein the query image contains an image of a government issued identification.

14. An apparatus comprising:
a storage device to store instructions; and
a processing device, wherein the processing device executes instructions that cause the apparatus to:
receive a query image;
extract a plurality of query feature points from the query image wherein each query feature point is a vector comprising an appearance-based descriptor, two spatial coordinates, a scaling factor, and an orientation factor;
match the query feature points to one of a plurality of template feature points in a template image;
calculate a confidence indicator for each query feature point match;
map the confidence indicators within a four dimensional space divided into a plurality of bins, a first dimension of the four dimensional space corresponding to a first of the two spatial coordinates, a second dimension of the four dimensional space corresponding to a second of the two spatial coordinates, a third dimension of the four dimensional space corresponding to the scale factor, and a fourth dimension of the four dimensional space corresponding to the orientation factor; and
determine that the query image contains a match to the template image when a number of confidence indicators in at least one of the plurality of bins is greater than a threshold value.

15. The apparatus of claim 14, wherein the instructions cause the processor to match the query feature points to the template feature points by, for each query feature point:
calculating the distance from a query feature point descriptor to each descriptor corresponding to the template feature points; and
identifying the template feature point having the closest descriptor as the matching template feature point.

16. The apparatus of claim 14, wherein the instructions cause the processor to calculate the confidence indicator by calculating a difference between each respective coordinate of a matched query feature point and template feature point.

* * * * *